US009355421B2

(12) United States Patent
Beaver, III et al.

(10) Patent No.: US 9,355,421 B2
(45) Date of Patent: *May 31, 2016

(54) PRODUCT OPTIONS FRAMEWORK AND ACCESSORIES

(71) Applicant: Zazzle Inc., Redwood City, CA (US)

(72) Inventors: Robert Irven Beaver, III, San Francisco, CA (US); Leslie Young Harvill, Half Moon Bay, CA (US); Richard Harold Bean, Cupertino, CA (US)

(73) Assignee: Zazzle Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,918

(22) Filed: Oct. 7, 2014

(65) Prior Publication Data

US 2015/0025994 A1    Jan. 22, 2015

Related U.S. Application Data

(63) Continuation of application No. 13/601,931, filed on Aug. 31, 2012, now Pat. No. 8,856,160.

(60) Provisional application No. 61/529,883, filed on Aug. 31, 2011.

(51) Int. Cl.
| | |
|---|---|
| *G06Q 30/06* | (2012.01) |
| *G06T 19/00* | (2011.01) |
| *H04N 1/00* | (2006.01) |
| *H04N 1/387* | (2006.01) |

(52) U.S. Cl.
CPC ........ *G06Q 30/0621* (2013.01); *G06Q 30/0643* (2013.01); *G06T 19/00* (2013.01);
(Continued)

(58) Field of Classification Search
CPC ........... G06Q 30/0621; G06Q 30/0643; Y10S 707/948; Y10S 707/962; H04N 1/3871; H04N 1/00161; H04N 1/0019; H04N 1/3875; G06T 19/00; G06T 2200/16; G06T 2210/36
USPC ................................ 707/758, 948
See application file for complete search history.

(56) References Cited

U.S. PATENT DOCUMENTS

| | | | | | |
|---|---|---|---|---|---|
| 5,897,622 | A | * | 4/1999 | Blinn ..................... | G06Q 30/06 705/26.81 |
| 5,999,914 | A | * | 12/1999 | Blinn ..................... | G06Q 30/02 705/14.1 |

(Continued)

FOREIGN PATENT DOCUMENTS

| | | |
|---|---|---|
| EP | 1124200 A2 | 8/2001 |
| EP | 1 365 358 A2 | 11/2003 |

(Continued)

OTHER PUBLICATIONS

Qin et al., "Product Configuration Flow from Obtaining Customer Requirement to Providing the Final Customized Product", Journal of Software, vol. 7, No. 2 (2012), pp. 308-315, Feb. 2012.*
Current Claims in application No. PCT/US12/53535, dated Feb. 2013, 5 pages.
Claims for PCT application PCT/US12/53535, dated Aug. 31, 2012, 5 pages.

(Continued)

*Primary Examiner* — Phuong Thao Cao
(74) *Attorney, Agent, or Firm* — Hickman Palermo Becker Bingham LLP

(57) ABSTRACT

Techniques are described for describing and associating custom products. In an embodiment, a first attribute value that defines an attribute of a custom product is received from a user that is customizing the custom product. In response to receiving the first attribute value, a legal set of attribute values for a second attribute of the custom product or an accessory product may be determined. The legal set of attribute values identifies one or more attribute values of the second attribute of the custom product or accessory product that are compatible with the first attribute value. The legal set of attribute values may identify a continuous range of values where any value within the continuous range of values is compatible with the first attribute value. In an embodiment, the user may be limited to selecting accessory products having a legal attribute value.

20 Claims, 6 Drawing Sheets

(52) U.S. Cl.
CPC ........ *H04N 1/0019* (2013.01); *H04N 1/00161* (2013.01); *H04N 1/3871* (2013.01); *H04N 1/3875* (2013.01); *G06T 2200/16* (2013.01); *G06T 2210/36* (2013.01); *Y10S 707/948* (2013.01); *Y10S 707/962* (2013.01)

(56) References Cited

U.S. PATENT DOCUMENTS

| | | | |
|---|---|---|---|
| 6,058,373 A * | 5/2000 | Blinn | G06Q 10/087 705/22 |
| 6,343,287 B1 * | 1/2002 | Kumar | G06F 17/30557 |
| 6,542,515 B1 * | 4/2003 | Kumar | H04L 67/303 370/463 |
| 6,591,011 B1 | 7/2003 | Nielsen | |
| 6,664,972 B2 | 12/2003 | Eichel et al. | |
| 6,725,257 B1 | 4/2004 | Cansler et al. | |
| 7,016,869 B1 | 3/2006 | Haeberli | |
| 7,062,483 B2 | 6/2006 | Ferrari et al. | |
| 7,107,226 B1 * | 9/2006 | Cassidy | G06Q 30/0625 705/26.62 |
| 7,117,293 B1 * | 10/2006 | Graziano | G06F 17/30607 707/999.202 |
| 7,376,891 B2 * | 5/2008 | Hitchock | G06F 17/243 715/221 |
| 7,502,788 B2 | 3/2009 | Balasubramanian | |
| 7,617,184 B2 | 11/2009 | Ferrari et al. | |
| 7,702,645 B2 * | 4/2010 | Khushraj | G06F 17/30525 707/999.102 |
| 7,730,053 B2 | 6/2010 | Sauermann | |
| 7,734,731 B2 | 6/2010 | Ordille et al. | |
| 7,761,397 B2 | 7/2010 | Huelsman et al. | |
| 7,831,589 B2 | 11/2010 | Balasubramanian | |
| 7,856,434 B2 | 12/2010 | Gluzman Peregrine et al. | |
| 7,865,523 B2 | 1/2011 | Caballero et al. | |
| 7,885,956 B2 | 2/2011 | Danish et al. | |
| 7,930,313 B1 * | 4/2011 | Geva | G06F 17/30395 707/766 |
| 8,175,931 B2 * | 5/2012 | Harvill | G06Q 30/06 705/26.1 |
| 8,190,486 B1 | 5/2012 | Ouimet | |
| 8,290,822 B2 | 10/2012 | Gade et al. | |
| 8,335,724 B2 | 12/2012 | Sipes et al. | |
| 8,429,110 B2 | 4/2013 | Cai et al. | |
| 8,458,050 B2 | 6/2013 | Bagley et al. | |
| 8,495,072 B1 * | 7/2013 | Kapoor | H04L 67/327 707/754 |
| 8,495,163 B2 | 7/2013 | Ordille et al. | |
| 8,566,714 B1 | 10/2013 | Stringer et al. | |
| 8,700,492 B1 * | 4/2014 | Scott | G06Q 30/0643 705/27.1 |
| 8,873,829 B1 * | 10/2014 | Tyra | G06K 9/726 382/140 |
| 2001/0034668 A1 | 10/2001 | Whitworth | |
| 2002/0030689 A1 | 3/2002 | Eichel et al. | |
| 2002/0073001 A1 * | 6/2002 | Palmer | G06Q 30/02 705/29 |
| 2002/0083039 A1 | 6/2002 | Ferrari et al. | |
| 2003/0038799 A1 * | 2/2003 | Smith | G06T 19/00 345/420 |
| 2003/0080978 A1 | 5/2003 | Navab et al. | |
| 2003/0182402 A1 * | 9/2003 | Goodman | H04N 1/00132 709/220 |
| 2004/0133081 A1 | 7/2004 | Teller et al. | |
| 2004/0143644 A1 * | 7/2004 | Berton | G06F 17/30545 709/217 |
| 2005/0138078 A1 | 6/2005 | Christenson et al. | |
| 2005/0164766 A1 | 7/2005 | Haim et al. | |
| 2005/0234993 A1 | 10/2005 | Ordille et al. | |
| 2005/0258234 A1 | 11/2005 | Silverbrook et al. | |
| 2005/0271283 A1 | 12/2005 | Dekel et al. | |
| 2005/0276444 A1 | 12/2005 | Zhou et al. | |
| 2006/0004697 A1 | 1/2006 | Lipsky et al. | |
| 2006/0038815 A1 | 2/2006 | Loberg | |
| 2006/0041421 A1 * | 2/2006 | Ta | G06F 21/10 704/5 |
| 2006/0107203 A1 * | 5/2006 | Schilling | G06F 17/218 715/248 |
| 2006/0155612 A1 | 7/2006 | Haeberli | |
| 2006/0197775 A1 | 9/2006 | Neal | |
| 2007/0033568 A1 | 2/2007 | Barrieau et al. | |
| 2007/0067179 A1 | 3/2007 | Kerr et al. | |
| 2007/0094204 A1 | 4/2007 | Huelsman et al. | |
| 2007/0098234 A1 | 5/2007 | Fiala | |
| 2007/0112731 A1 * | 5/2007 | Balasubramanian | G06F 17/30985 |
| 2007/0124215 A1 | 5/2007 | Simmons | |
| 2007/0143082 A1 | 6/2007 | Degnan | |
| 2007/0168336 A1 | 7/2007 | Ransil et al. | |
| 2007/0174781 A1 | 7/2007 | Begin et al. | |
| 2007/0203798 A1 | 8/2007 | Caballero et al. | |
| 2007/0226066 A1 * | 9/2007 | Brunner | G06Q 30/06 705/26.8 |
| 2007/0226155 A1 | 9/2007 | Yu et al. | |
| 2008/0069451 A1 | 3/2008 | Ikeda | |
| 2008/0091551 A1 | 4/2008 | Olheiser et al. | |
| 2008/0162305 A1 | 7/2008 | Rousso et al. | |
| 2008/0247674 A1 | 10/2008 | Walch | |
| 2008/0285854 A1 | 11/2008 | Kotake et al. | |
| 2009/0028414 A1 | 1/2009 | Crandall et al. | |
| 2009/0043673 A1 | 2/2009 | Caballero et al. | |
| 2009/0043759 A1 | 2/2009 | Danish et al. | |
| 2009/0089174 A1 * | 4/2009 | Brunner | G06Q 30/0621 705/26.5 |
| 2009/0177551 A1 | 7/2009 | Cue et al. | |
| 2009/0195538 A1 | 8/2009 | Ryu et al. | |
| 2009/0271295 A1 | 10/2009 | Hodge | |
| 2009/0282403 A1 * | 11/2009 | Poole | H04L 67/34 717/178 |
| 2009/0289955 A1 | 11/2009 | Douris et al. | |
| 2009/0317010 A1 | 12/2009 | Gerhard et al. | |
| 2009/0324100 A1 | 12/2009 | Kletter et al. | |
| 2010/0036753 A1 * | 2/2010 | Harvill | G06Q 30/06 705/26.1 |
| 2010/0048290 A1 | 2/2010 | Baseley et al. | |
| 2010/0066731 A1 | 3/2010 | Vecore et al. | |
| 2010/0066750 A1 | 3/2010 | Yu et al. | |
| 2010/0092079 A1 | 4/2010 | Aller | |
| 2010/0114874 A1 * | 5/2010 | Hansson | G06F 17/30864 707/722 |
| 2010/0124384 A1 | 5/2010 | Edgar et al. | |
| 2010/0145492 A1 | 6/2010 | Russell | |
| 2010/0185529 A1 | 7/2010 | Chesnut et al. | |
| 2010/0189316 A1 | 7/2010 | Walch | |
| 2010/0238166 A1 | 9/2010 | Tamstorf et al. | |
| 2010/0287511 A1 | 11/2010 | Meier et al. | |
| 2010/0318476 A1 | 12/2010 | Huelsman et al. | |
| 2011/0064388 A1 * | 3/2011 | Brown | G06T 13/20 386/285 |
| 2011/0098837 A1 | 4/2011 | Yucel et al. | |
| 2011/0102440 A1 | 5/2011 | Yuen et al. | |
| 2011/0208618 A1 | 8/2011 | Christenson et al. | |
| 2011/0225038 A1 | 9/2011 | Fontoura et al. | |
| 2011/0280447 A1 | 11/2011 | Conwell | |
| 2011/0305368 A1 | 12/2011 | Osako | |
| 2012/0039547 A1 | 2/2012 | Gerhard et al. | |
| 2012/0047045 A1 | 2/2012 | Gopikrishna et al. | |
| 2012/0117072 A1 | 5/2012 | Gokturk et al. | |
| 2012/0123674 A1 | 5/2012 | Perks et al. | |
| 2012/0158535 A1 | 6/2012 | Barrieau et al. | |
| 2012/0218300 A1 | 8/2012 | Hayakawa | |
| 2012/0224743 A1 * | 9/2012 | Rodriguez | G06T 11/60 382/103 |
| 2013/0054651 A1 * | 2/2013 | Shepherd | G06Q 30/02 707/794 |
| 2013/0057549 A1 | 3/2013 | Beaver, III et al. | |
| 2013/0060801 A1 * | 3/2013 | Beaver, III | G06T 19/00 707/758 |
| 2013/0117227 A1 * | 5/2013 | Kruglick | G06F 17/30575 707/626 |
| 2013/0304604 A1 * | 11/2013 | Hoffman | G06Q 30/0621 705/26.5 |
| 2014/0160118 A1 | 6/2014 | Beaver, III et al. | |
| 2014/0201187 A1 * | 7/2014 | Larson | G06F 17/30613 707/711 |

(56) References Cited

U.S. PATENT DOCUMENTS

| | | | | |
|---|---|---|---|---|
| 2014/0215477 A1* | 7/2014 | Chen | ................... | G06F 9/5066 718/102 |
| 2014/0223575 A1* | 8/2014 | Nandi | ............... | G06Q 30/0282 726/27 |
| 2015/0095345 A1* | 4/2015 | Arai | ................. | G06F 17/30321 707/744 |

FOREIGN PATENT DOCUMENTS

| | | |
|---|---|---|
| EP | 1365358 A2 | 11/2003 |
| JP | 2001-521659 A | 11/2001 |
| JP | 2003-264740 | 6/2003 |
| JP | 2007-257176 | 10/2007 |
| JP | 2010-117870 | 5/2010 |
| JP | 2010-231529 | 10/2010 |
| JP | 2010-287174 A | 12/2010 |
| WO | WO 98/47106 | 10/1998 |
| WO | WO 2009/094724 A1 | 8/2009 |
| WO | WO2009/094724 A1 | 8/2009 |

OTHER PUBLICATIONS

Hirokazu Kato et al. Marker Tracking and HMD Calibration for a Videobased Augmented Reality Conferencing System, San Francisco, USA Dated Oct. 1999, 10 pages.

Hirokazu Kato and Mark Billnghurst. "ARToolkit User Manual", Human Interface Technology Lab, University of Washington, dated 2000, 44 pages.

European Patent Office, Office Action, in application No. 12181208.5 1238, dated Dec. 6, 2012, 7 pages.

Daniel Wagner, Tobias Langlotz, and Dieter Schmalstieg, Robust and Unobtrusive Marker Tracking on Mobile Phones, Washington, DC, USA, Dated 2008, IEEE Computer Society, 4 pages.

Current Claims PCT/2012/053536, dated Nov. 2012, 5 pages.

Internatioanal Searching Authority, "Search Report", in application No. PCT/2012/053536, dated Nov. 9, 2012, 10 pages.

Current Claims in European application No. 12181208.5 1238, dated Dec. 2012, 4 pages.

International Searching Authority, "Search Report" in application No. PCT/US12/53535, dated Feb. 5, 2013, 12 pages.

Choudary et al, "March: Mobile Augmented Reality for Cultural Heritage", MM 2009, dated Oct. 19-24, 2009, Beijing China, 2 pages.

Capterra Website, "Top Product Configurator Software Products", dated 2014, Reviews of the Best Systems, accessed online <http://www.capterra.com/product-configurator-software> on May 28, 2014, 15pgs.

"Product Configurator", IBM, available: <http://www.-01.ibm.com/software/commerce/products/products/product-configurator/>, retrieved Nov. 26, 2013, 1 page.

"Product Configuration System", ORACLE, available: <http://www.bigmachines.com/product_configuration_system.php>, retrieved Nov. 26, 2013, 1 page.

"Knowledge-based configuration", Wikipedia, available: <http://en.wikipedia.org/wiki/Knowledge-based_configuration>, retrieved Nov. 26, 2013, 4 pages.

"IBM Sterling Configurator—Customize complex products, services and bundles", IBM Software, available: <http://www.-01.ibm.com/software/commerce/products/products/product-configurator/>, Nov. 26, 2013, 3 pages.

Current Claims in Japan application No. 2012-191111, dated Mar. 2014, 4 pages.

Nima Soltani, Mehmet Yilmax, "Using Augmented-Reality on Planar Surfaced for Previewing Décor Changes", Stanford University EE368 Class Project Spring, dated 2010, 5 pages.

W. Lee and W. Woo, "Real-time Color Correction for Marker-Based Augmented Reality Applications", International Workshop on Ubiquitous VR (IWUVR2009), dated 2009, 4 pages.

Soltani et al., "Using Augmented-Reality on Planar Surfaces for Previewing Décor Changes", Stanford University EE368 Class Project Spring 2010, 5 pages.

Schalkoff R.J., "Syntactic Pattern Recognition (Syntrp) Overview", dated Jan. 1, 1992, Pattern Recognition: Structural, Structural and Neural Approaches, 68 pages.

Ryan A. Beasley, Semiautonomous Medical Image Segmentation Using Seeded Cellular Automation Plus Edge Detector, dated 2012, Article ID 914232, 9 pages.

Rosin, Paul, "Training Cellular Automata for Image Processing", SCIA dated 2005, LNCS, 10 pages.

Rekimoto, Jun, "Matrix: A Realtime Object Identification and Registration Method for Augmented Reality", Computer Human Interaction, dated Jul. 15-17, 1998, 6 pages.

Homayoun Bagherinia O Roberto Manduchi, Robust Real-Time Detection of Multi-Color Markers on a Cell Phone, J Real-Time Image Proc., Dated Jun. 3, 2011, 17 pages.

Pakemon AR Marker in Sep. 2001 (http://pokemasters.net/forums/showthread.php?t=24845) 17 pages.

Zhang et al., "Visual Marker Detection and Decoding in AR Systems: A Comparative Study", IEEE, dated 2002, 10 pages.

Martin Hirzer, "Marker Detection for Augmented Reality Applications", Graz University of Technology, Austria, Dated Oct. 27, 2008, 27 pages.

Mark Fiala, "Artag, A Fiducial Marker System Using Digital Techniques", In CVRP '05: Proceedings of the 2005 IEEE, dated 2005, 7 pages.

Jun Rekimoto and Yuji Ayatsuka, "CyberCode: Designing Augmented Reality Environments with Visual Tags", Proceedings of DARE 2000 on Designing, Dated Apr. 2000, 10 pages.

Johannes Kohler, Alain Pagani, and Didier Stricker, Detection and Identification Techniques for Markers Used in Computer Vision, VLUDS.2010.36, dated 2010, 9 pages.

Japan Patent Office, "Notice of Grounds for Rejection" in application No. 2012-191111, dated Mar. 11, 2014, 4 pages.

ISR WO for PCT Application PCT/US12/53535, dated Aug. 31, 2012, 12 pages.

Pantida Patirupanusara, Marker-Based Augmented Reality Magic Book for Anatomical Education, dated May 26-27, 2012, Phuket, 3 pages.

U.S. Appl. No. 13/601,931, filed Aug. 31, 2012, Office Action.
U.S. Appl. No. 13/539,788, filed Jul. 2, 2012, Office Action.
U.S. Appl. No. 14/181,544, filed Feb. 14, 2014, Office Action.
U.S. Appl. No. 13/601,941, filed Aug. 31, 2012, Final Office Action.
U.S. Appl. No. 13/601,941, filed Aug. 31, 2012, Office Action.
U.S. Appl. No. 13/601,931, filed Aug. 31, 2012, Notice of Allowance.
U.S. Appl. No. 13/539,788, filed Jul. 2, 2013, Final Office Action.
X. Zhang et al., Visual Marker Detection and Decoding in AR Systems: A Comparative Study, IEEE, ACM, dated Sep. 2002, pp. 97-106.

Cardone A. et al., A Survey of Shape Similarity Assessment Algororithms for Product Design and Manufacturing Applications, J Comput Inf. Science Eng 3:109-118, dated 2003.

U.S. Appl. No. 14/181,544, filed Feb. 14, 2014, Final Office Action.
U.S. Appl. No. 13/601,941, filed Aug. 31, 2012, Notice of Allowance.
Schalfoff R, J:, "Syntactic Pattern Recognition SYNTPR Overview" Pattern Recognition Statistical, Structural and Neural Approaches, dated Jan. 1, 1992, 68 pages.

European Patent Office, "Search Report" in application No. 12 181 208.5 -1955, dated Feb. 26, 2015, 5 pages.

European Claims in application No. 12 181 208.5-1955, dated Feb. 2015, 4 pages.

Claims in Canadian Application No. 2,785,412, dated Nov. 2015, 5 pages.

Canadian Intellectual Property Office, "Search Report" in application No. 2,785,412, dated Nov. 18, 2015, 4 pages.

U.S. Appl. No. 13/601,941, filed Aug. 31, 2013, Office Action.
U.S. Appl. No. 13/601,941, filed Aug. 31, 2012, Interview Summary.

* cited by examiner

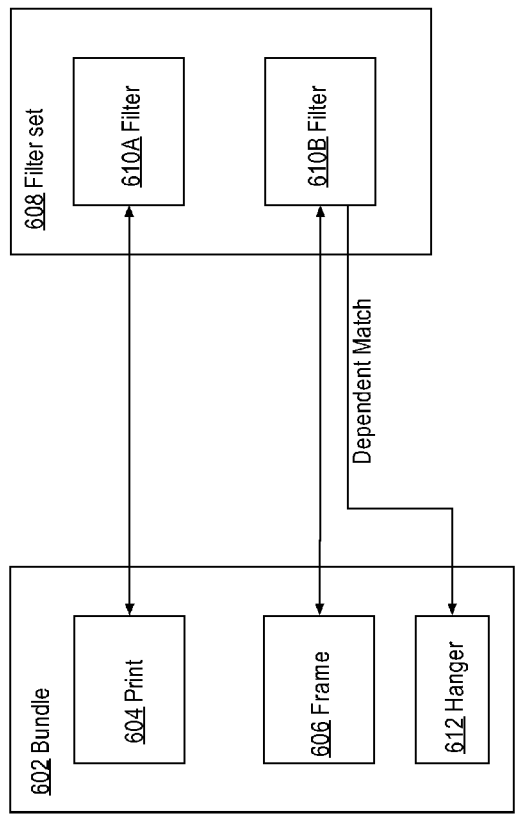
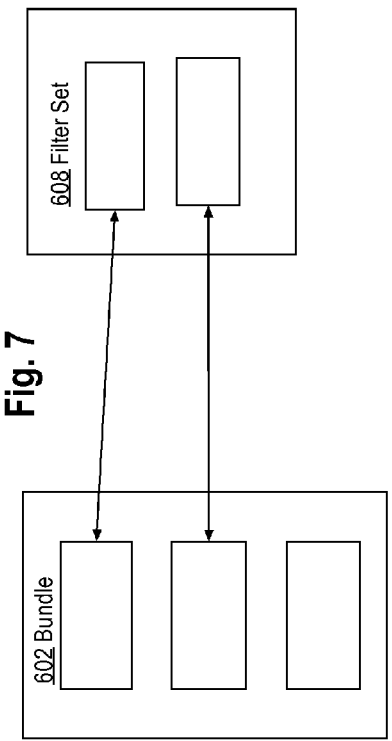
Fig. 6
Fig. 7

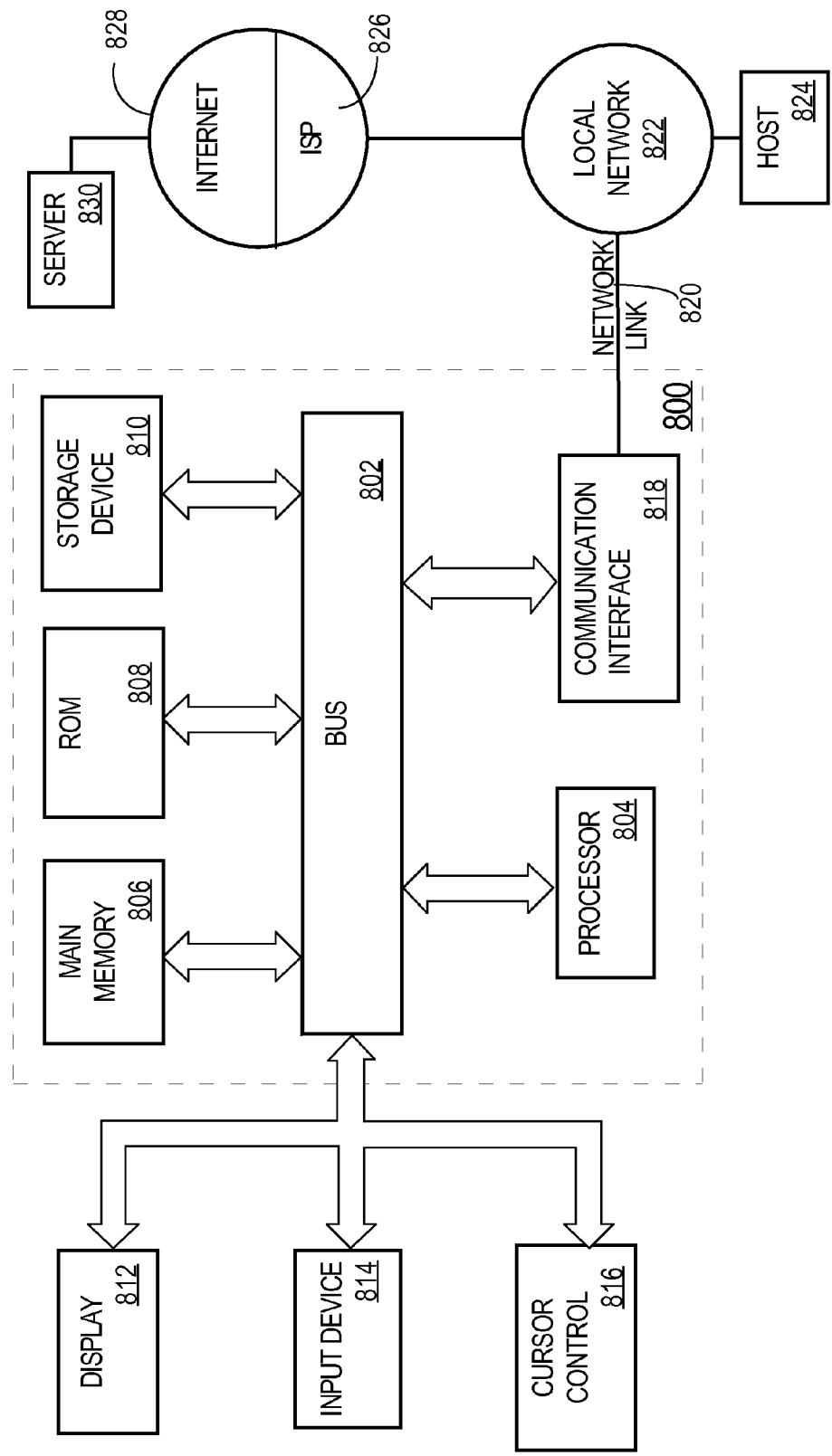

PRODUCT OPTIONS FRAMEWORK AND ACCESSORIES

CROSS-REFERENCE TO RELATED APPLICATION

This application claims the benefit under 35 USC §120 as a Continuation of application Ser. No. 13/601,931, filed Aug. 31, 2012, now U.S. Pat. No. 8,856,160,which claims the benefit under 35 U.S.C. 119(e)of U.S. Provisional Patent Application No. 61/529,883 entitled "Data Processing Methods Relating To Framing" filed Aug. 31, 2011, the entire contents for each of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

This application is related to U.S. application Ser. No. 11/925,716, filed Oct. 26, 2007, U.S. application Ser. No. 13/539,788, filed Jul. 2, 2012, now U.S. Pat. No. 9,147,213, and U.S. application Ser. No. 13,601,941, filed Aug. 31, 2012, now U.S. Pat. No. 9,183,582, the contents of all of which are incorporated herein, by reference, in their entirety for all purposes as if fully set forth herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online shopping and other ecommerce sites enable end users to browse, select, and order products over a network connection. In many cases, these sites implement a relational database management system (RDBMS) to store and maintain information about the products that are available. When the end user queries the site for information about a particular product or set of products, the site accesses product information from product records stored in the RDBMS and returns this information for display to the end user.

In a computer system that enables users to order custom manufactured products, describing products that are available for ordering presents special challenges for computer-implemented data definitions. The data definitions should provide a way to describe a broad range of goods quickly and flexibly in terms of data characteristics. Each product has numerous attributes and the potential to be combined with or used with a plurality of other products, representing vast numbers of permutations. For example, users may have thousands of choices of individual products and many products may be compatible with or act as accessories to other products. These issues are particularly complex in the case of custom manufactured framed or mounted products in which a customer can select or upload an arbitrary image, choose a frame and mat or mounting, glazing or other protection, and then order the assembled product; a particular customer-defined product may be entirely unique in the history of all previously ordered products, yet the computer system must be able to determine if manufacturing the product is possible or practical given what the customer selected.

In this context, relational database structures and other methods of describing products and their attributes have proven inadequate and inflexible. Typical RDBMS implementations have required extensive programming of stored procedures or other custom code to resolve compatibilities and match accessories to products. Further, the number of stored records required in a custom manufacturing context is impractical. As a simple example, if shirts are offered in 50 styles, with 10 possible colors, and 5 possible sizes, then the RDBMS would have to store 2,500 records to represent all unique stock numbers (SKUs) for products that a customer could potentially order. However, customers also might never order a particular SKU because it represents an unusual or illegal combination. For example, a men's shirt style with tangerine and pink stripes in a Baby size may not be available for ordering. As a more complex example, the permutations for a product such as a framed print are potentially in the trillions when attributes are constrained, and infinite when attributes are continuously variable within broad ranges. Therefore, generating fixed records for every conceivable product permutation would waste storage.

BRIEF DESCRIPTION OF DRAWINGS

FIG. 6 illustrates relationships of products and filters;

FIG. 7 illustrates unequal relationships of products and filters;

FIG. 8 is a block diagram that illustrates a computer system with which the techniques herein may be implemented.

DESCRIPTION OF EXAMPLE EMBODIMENTS

Figure 1:
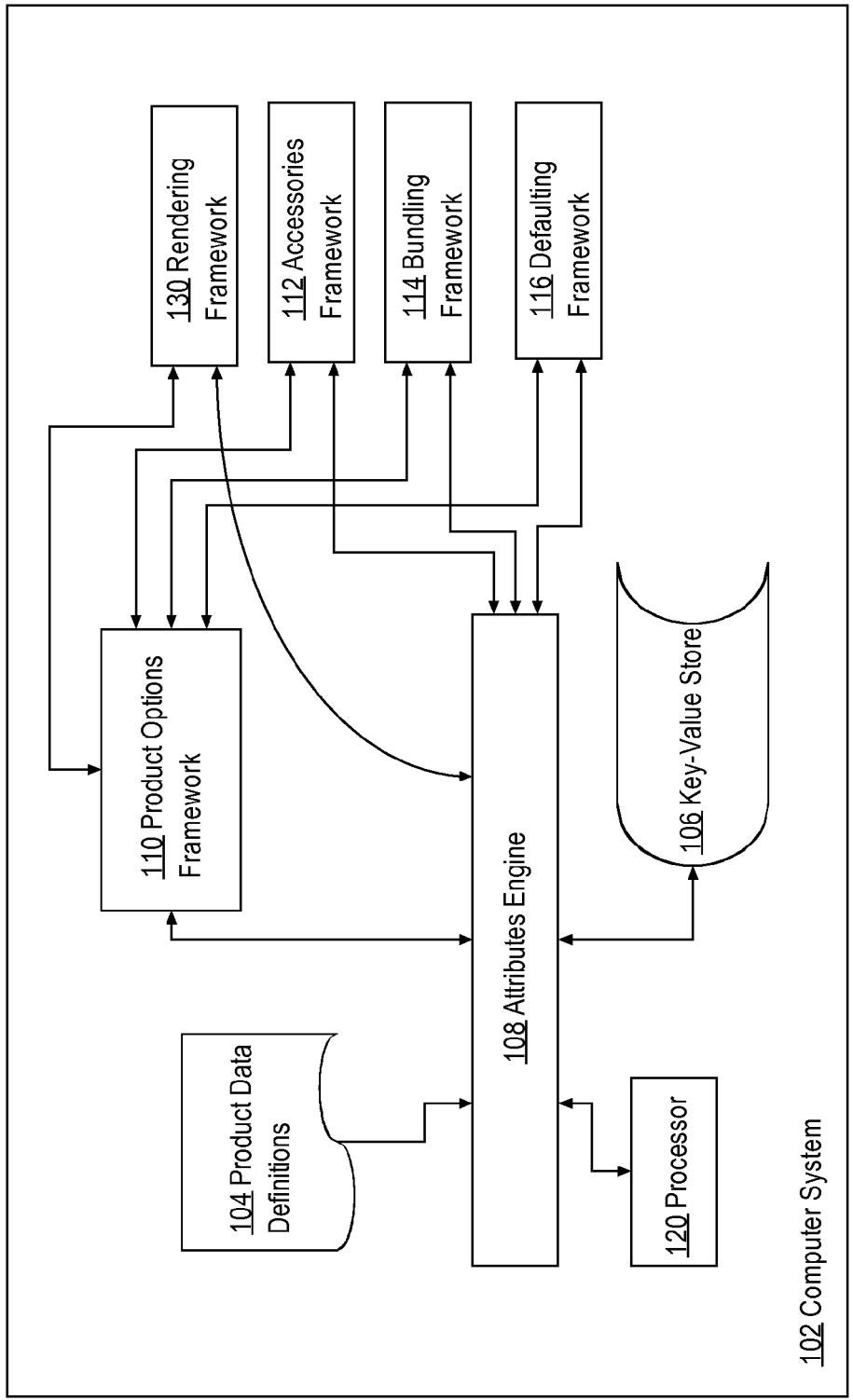
FIG. 1 illustrates a system including an attributes engine and product options framework for modeling custom products.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Flexible Framework for Defining and Customizing Products and Accessories
   3.1 Attributes Engine: Key-Value Descriptions and Options Strings
   3.2 Product Options Framework
   3.3 Accessories Framework
   3.4 Bundling Framework for Grouped Products
   3.5 Default Framework
   3.6 Rendering Framework
   3.7 Additional Frameworks
4.0 Implementation Mechanisms—Hardware Overview
5.0 Extensions and Alternatives
1.0 General Overview Techniques are described for describing and associating custom products. In an embodiment, a first attribute value that defines an attribute of a custom product is received from a user that is customizing the custom product. In response to receiving the first attribute value, a legal set of attribute values for a second attribute of the custom product or an accessory product may be determined. The legal set of attribute values identifies one or more attribute values of the second attribute of the custom product or the accessory product that are compatible with the first attribute value. The legal set of attribute values may identify a continuous range of values where any value within the continuous range of values is compatible with the first attribute value. In an embodiment, the user may be limited to selecting an attribute value within the legal range of values. In another embodiment, the first attribute value may be an arbitrary attribute value selected by the user that is customizing the custom product.

In an embodiment, a set of one or more accessory products that have an attribute value within the legal set of attribute values is identified. The one or more accessory products may then be displayed to the user as recommended products that are compatible with the custom product. In another embodiment, a particular accessory of the set of one or more accessory products is identified. A third attribute value defining a third attribute of the particular accessory product may then be identified. The compatibility of the third attribute with respect to the custom product is then determined. In response to determining that the custom product is not compatible with the third attribute value, recommendation of the particular accessory product to the user may be prevented.

In an embodiment, determining a legal set of attribute values for a second attribute of an accessory product may be based on key-value expressions. In response to receiving the first attribute value, a key-value expression including a key-value pair that associates the first attribute value with the first attribute may be formed. The key-value expression is then matched with one or more option strings that identify the legal set of attribute values for the second attribute.

In an embodiment, the custom product may be part of a product bundle that associates the custom product with a second product. The custom product may be associated with a first filter that identifies a first set of constraints associated with the custom products, and the second product may be associated with a second filter that identifies a second set of constraints associated with the second product. A set of one or more accessory products that satisfy the first set of constraints and the second set of constraints is then determined and may be recommended to the user as compatible with the product bundle. In another embodiment, the second filter may specify that the second product is dependent on the custom product. If the user removes the custom product from the bundle, then the second product may also be removed from the product bundle.

In an embodiment, key-value expressions for a product bundle may be mapped to one or more render files. Based on the render files, an image of the product bundle may be rendered and displayed to the user.

In an embodiment, a first default value for a third attribute of the custom product may be displayed before receiving the first attribute value. In response to receiving the first attribute value, a second default value, different from the first default value, for the third attribute of the custom product may be displayed.

2.0 Structural and Functional Overview

According to techniques described herein, a system may be configured to offer users the opportunity to order products having arbitrary attribute values. For example, in the case of custom manufactured framed products such as photos, digital images, artwork, and other frameable images, the system may offer users the opportunity to order images and frames having arbitrary sizes. Thus, rather than restricting users to ordering products in fixed sizes such as 8×10 inches, 20×30 inches, etc., the system may permit a user to request products in arbitrary sizes such as 10.5×29.3 inches. Accordingly the customizable products may be offered in a continuously variable range of values so that it is impracticable to represent all possible dimensions of products as discrete values in an RDBMS. When an attribute value may fall anywhere within a continuous spectrum of a specified range (e.g., 4 inches to 48 inches), the number of unique possible values that a customer could specify would be extremely expensive, if not impossible, to store.

In other embodiments, the system may be configured to offer the user the option to purchase only selected products that are known to be compatible with a first product. Still further, when a particular first product having specified first attributes is selected, the system may modify the attributes of a second product or make certain attributes unavailable for the second product. Still further, the system may offer the user a default product option or a particular default attribute in order to simplify the ordering process and ensure that completed orders are accurate.

Further, if products can have dimensions that are represented in any of a continuous range of values, then determining whether one product is compatible with another product may be extremely challenging. The selection of an arbitrary value may have implications for other attribute values of the final custom product and how an image of the final custom product should be rendered. For example, if a user is ordering a framed print that is 6 inches in one dimension, then it may be inappropriate to offer the user the option to purchase a frame or mat combination that cannot fit the dimensions that have been ordered. As another example, it may be impossible to cut glazing or other products to manufacture products in particular specified sizes. As another example, certain papers cannot be cut in particular dimensions and ordering a particular paper for a mat of a particular size may require a different kind of manufacturing process. These constraints may be inter-related, adding to the complexity of the system.

According to techniques described herein, such constraints may be efficiently represented in an information model that allows for great flexibility in designing custom products. In some embodiments, at the time that a user is designing a product, the system queries a database of products or other information modeling element about what attributes and related products or accessories are valid or otherwise allowed. The database or other information modeling elements may provide a way to prune a result set of products that are compatible; the result set also may limit or modify the product under design.

FIG. 1 illustrates a system including an attributes engine and product options framework for modeling custom products that may implement various embodiments. Computer system 102 comprises a plurality of product data definitions 104 that are processed using attributes engine 108 and stored in key-value store 106. A processor 120, which may comprise a central processing unit (CPU) or multiple CPU cores of a server computer, hosts or other computing devices executes the attributes engine 108 as well as a product options framework 110, accessories framework 112, bundling framework 114, defaulting framework 116 and rendering framework 130. Each of the accessories framework 112, bundling framework 114, defaulting framework 116 and rendering framework 130 is coupled to and capable of accessing functions provided in the product options framework 110. Each of the attributes engine 108 and frameworks 110, 112, 114, 116, 130 may comprise a set of inter-operable computer programs in the form of object-oriented classes, data definitions, and database procedures; each of the frameworks may expose an application programming interface (API) of functions that are callable by methods of other frameworks. In some embodiments one or more elements of FIG. 1 may be omitted or combined with other elements, depending on the implementation. In addition, computer system 102 may include additional elements and logic, depending on the implementation, that are not illustrated for purposes of brevity.

In an embodiment, elements including without limitation the attribute engine and elements discussed above and termed "framework" may be implemented in the form of computer program instructions that are stored or recorded in one or more non-transitory storage media and later loaded into the memory of a general-purpose computer or special-purpose computer and executed by processor 120. Each element of logic may comprise or be represented in the form or content of the electronic digital memory, registers or processors of the computer upon execution of the instructions. In another embodiment, each of these elements may be implemented in the form of electronic digital circuit logic using one or more application-specific integrated circuits (ASICs), field programmable gate arrays (FPGAs), or other hardware elements, including those described further herein with reference to FIG. 6. Each element of FIG. 1 is described in further detail below.

3.0 Flexible Framework for Defining and Customizing Products and Accessories 3.1 Attributes Engine: Key-Value Descriptions and Options Strings In an embodiment, attribute engine 108 is configured with logic that supports a specified syntax that can flexibly describe product characteristics and their constraints. Product options framework 110 may use attribute engine 108 to determine how a custom product is currently defined, the restrictions and other constraints on how the custom product may be defined, and/or the relationship of the custom product to other products and render files.

In an embodiment, the specified syntax supported by attribute engine 108 is a key-value syntax that allows products characteristics and constraints to be described as a set of keys and values. A key may represent a particular attribute that may be used to describe one or more products. Each key may be associated with a particular value or a legal set of values, where a value represents a specific characteristic of the corresponding attribute. For example, in the case of a custom printed or manufactured shirt, the product may be described using keys including, without limitation, style, color, and size attributes. There may be 50 available values for the style attribute, 10 values for color, and 5 values for size, but not all permutations of the values may be available or capable of ordering.

A legal set of values for each key may be specified as a discrete set of values, a range of values, a computed set of values, or through any other suitable mechanism, depending on the implementation.

In an embodiment, an extensional syntax may be used to specify the legal set of values as a discrete set. The extensional syntax may comprise any suitable syntax for enumerating or otherwise defining each value that forms the legal set of values. For example, in the case of the custom manufactured or printed shirt, the legal set of values may be specified as three discrete values: red, green, or blue. Thus, a selection of any three of these values would constitute an available option. However, in the present example, a different color, such as yellow, would constitute an illegal value that is unavailable for the corresponding product attribute.

In an embodiment, an intentional syntax may be used to specify the legal set of values as a continuous range of values. Any arbitrary value that falls within the continuous range may be permitted as a legal value. Referring again to the case of the custom manufactured or printed shirt, the legal set of values may be specified as any RGB value between 0 and 256. Thus, any RGB value within the range 0 to 256 may constitute a valid color choice, and RGB values outside the specified range would be invalid. In another example, the product may be a print in which the width and height may be continuous values within bounds. Thus, the user may specify any arbitrary width or height for the print within the legal bounds.

A computed value may be any value or set of values that is computed based on an evaluation function. The computation may occur in real-time as a user is designing a custom product. For example, the evaluation function may compute the surface area of a custom print based on a width and height input. Once the surface area has been computed, the evaluation function may further classify the print as small, medium or large, depending on the computed surface area.

In an embodiment, each key may be associated with a namespace. A namespace may represent any particular product or class of product such as Shirt, Print, Frames, etc. Each namespace may be associated with a plurality of attribute definitions for potential attributes of custom products within the namespace. Consequently, by declarations of attributes and allowed values, it is possible for attribute engine 108 to describe a large range of products.

The key-value syntax is capable of serialization or expression in a text string and is capable of participating in matching operations as further described. A product options framework as further described herein may implement set mathematics to accomplish matching operations. The matching operations may be used for a variety of purposes, including, without limitation, matching custom product definitions to accessory filters, default filters, and render files.

As an example, a key-value expression may comprise:

style=basic & color=white & size=large  [1]

in which the character=is an operator and & is a separator. In this example and all other examples herein, bracketed numbers such as [1] merely identify an expression for purposes of the description herein and the bracketed numbers do not form a part of an expression or a syntax definition of expressions. The description [1] would match the following other expressions:

style=basic  [2]

style={basic, dark, hooded}  [3]

A match occurs because there is no conflict in set membership between the first expression and either the second or third expressions. In an embodiment, the product options framework may dynamically form expressions of the form of [1] and could potentially create and transiently store many such expressions. Expression [2] could be applied to a matching function to filter the stored expressions and generate a result set of only those stored expressions in which style=basic. Similarly, expression [3] may be used to filter the stored expressions into a result set in which the Style attribute is any of the specified set members.

In an embodiment, an expression may describe a product attribute as a computed value. For example, a Print product may have attributes of Width, Height, and Media. One expression associated with a Print product could be:

width={>=8, <=60}  [4]

Thus indicating that potential matches for the width may be greater than or equal to 8 units and less than or equal to 60 units; the units may be inches, centimeters, or other linear measurement units. In a traditional RDBMS approach, programming code would be required to achieve an equivalent expression or description of products whereas in the present approach a declaration may be used that is processed by a generalized matching function and other generalized framework functions.

Operators that connect keys and values may express equality, inequality, or constrained equality. For example, expressions may use:

key=value—to express equality to a value that is not required to be present [5]

key!=value—to express inequality [6]

key:=value—to express equality to a value that must be present [7]

For example, the expression style={basic, dark, fitted} & size!={small} [8]

would match Shirts having a style of basic, dark or fitted and not in a small size.

In an embodiment, a description of a product using a key-value expression of the specified syntax may be used to retrieve other information about the product, such as pricing, or other attributes of a product in which particular attribute values are not known in advance. A benefit of this approach is that new products or attribute values may be introduced into the system merely using new declarative expressions, rather than with complex programming. For example, adding a new product attribute that results in a product pricing change merely requires updating a Price attribute for that attribute and updating relatively simple conditional logic in a pricing table, for example, "when Product has Widget then Price is $29.95") rather than updating program logic or complex database tables.

Consequently, the number of products described in the complete computer system may be increased rapidly without an extensive number of programming changes. Declarative statements that capture simple business statements such as "all Shirts that are Large or Medium have Price P" or all Widgets that are Green cause Price to increase by $10." These statements can be created and entered by business analysts rather than software engineers, and may be used within the programmatic framework in the form of serialized statements that express key-value pairs combined using operators as shown above.

In an embodiment, the matching logic may use expressions of the form of [5], [6] and [7] above to create and store a count of actual matches between attribute values in a string that comprises two or more attributes; the resulting count expresses a degree of closeness in matching or how good a match exists between expressions. For instance, the closeness in matching may be determined based on the percentage of expressions of the form of [5] are satisfied. An expression of the degree of closeness of a match, or accomplishing inexact matches between expressions in which some attribute values are present and others are not, typically is not inherently implemented in a traditional RDBMS.

In an embodiment, the expression syntax and associated matching logic and other programmatic framework elements support declaring titles for products and contexts for products. For example, assume that a product is declared as:

[style=basic & color=white & size=large] [9]

A plurality of contexts also may be defined as:

[region=us & currency=usd] [10]

[region=gb & currency=gbp] [11]

Other examples of context include Site or Seller. For example, the same product processed by the platform may be treated differently depending on the offering website or the identity of the seller. For example, if the seller is Disney®, then only Disney® origin products could be offered by applying a filter to an attribute that describes the licensor, manufacturer, or other entity of origin for a particular product.

The product may have a title, price, and default values. For example, expression [10] may be the default context and [11] may be an overriding alternative context. Any number of contexts may be defined and used. For example, if an end user or customer located in Great Britain connects to a server computer implementing the techniques herein, then the server computer may retrieve [11] as the default context and pass that context string into matching functions that perform filtering functions or other determining functions. Inexact or approximate matches may result and the count of matching attributes may be used to drive data filtering or responsive messages or actions. For example, with [11] if the current user is in Great Britain but has selected Euros as a currency, expression [11] would not match and the system could throw an exception or present a corrective message.

Using this structure, continuous refinements may be introduced into product definitions over time without extensive programming or modification of database tables.

In an embodiment, the set matching logic returns a match when a second set is a complete subset of a first set. For example, the set {basic, dark} is a match to expression [8] above. In contrast, {basic, light} is not a match. In embodiment, the set matching logic is configured to enforce ordered lists. For example, for a print product, the notation [width, height] specifies an ordered list of dimensions and the declaration [8, 11] does not match [11, 8].

3.2 Product Options Framework

In an embodiment, a product options may be configured to enable defining products to facilitate the functions described above. The product options framework is a specific example use of the attribute engine described above to process or determine whether one product is compatible with a second product as an accessory or related product. The framework may interoperate with expressions in the key-value based syntax for defining product attributes and relationships, and specifying expressions that can be matched to other values. The framework may provide ways to declare dependencies, defaults, and filters for matching a first product to one or more second compatible products, for example, accessories to the first product. These approaches can overcome the failings of the traditional RDBMS approaches described above. Further, the approaches allow adding new and complex product descriptions efficiently using configuration values rather than custom programming.

Figure 2:
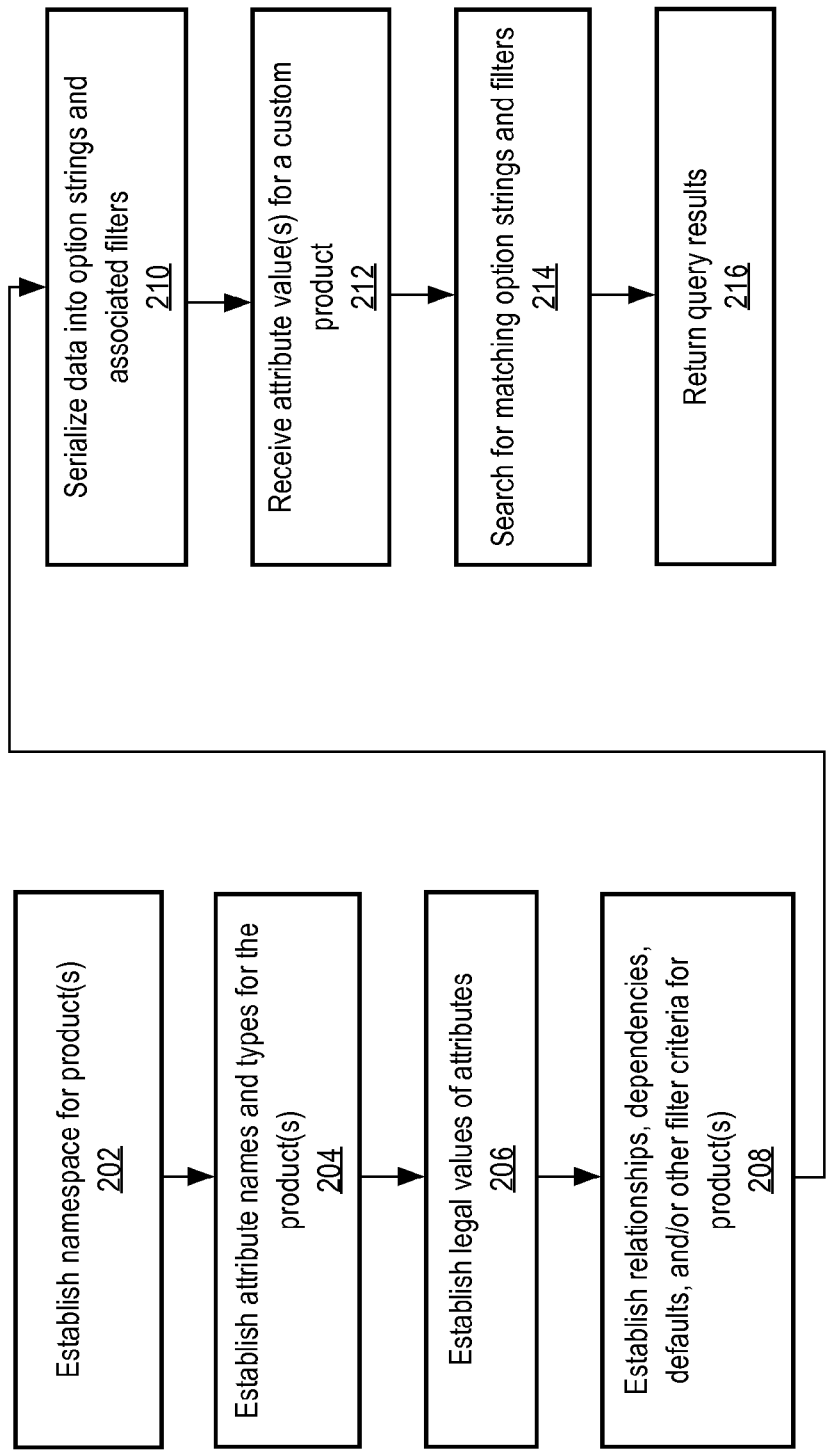
FIG. 2 is a flowchart illustrating an example process for implementing and using a product options framework, according to an embodiment.

FIG. 2 is a flowchart illustrating an example process for implementing and using a product options framework 110, according to an embodiment. In step 202, a namespace is established for one or more products. In an embodiment, each product defined in product data definitions 104 is associated with a descriptive namespace. A namespace may represent a class of product, such as Shirt, Print, etc.

In step 204, attribute names and types are established for the products. In an embodiment, each namespace has a plurality of attribute definitions for potential attributes of products. For the Print namespace, attributes may include, without limitation, a Size attribute defined as [Width, Height], and Media attribute. The attribute definitions comprise declarations of attribute names, legal attribute values, and attribute data types such as string, decimal, integer, array, Boolean.

In step 206, the legal values for the attributes established at step 204 are established for the corresponding products. Attribute values may be specified as a discrete set or a continuous range as describe above. Attribute values may also be computed or referential; for example, a Size could be Large, computed based on an Aspect Ratio of a selected digital image asset to be a rectangle that fits within range dimensions of 32×48 inches. The framework may implement an evaluation language to permit determining the computed values at the time that expressions are evaluated. A benefit of this approach is that declarations of legal values may be used rather than using a complex table join as in a typical RDBMS approach.

In an embodiment, each product also comprises definitions of key values; any attribute may be specified as a key value, and key values may be used in evaluation of expressions. The key values may comprise any combination of attributes that uniquely identify a product.

When a product has been defined in terms of a namespace, attributes, values, and key values, then one or more product options may be declared or defined with reference to the key values. Example product options comprise example expressions identified above.

In step 208, relationships, dependencies, defaults, and other filter criteria may be established for the one or more products. For example, this step may comprise defining accessory filters, default filters, render mappings, and other filters as described below. These filters may be used to identify constraints and prune result sets as a user is designing a custom product.

In step 210, the data is serialized into option strings and filter expressions. In an embodiment, serializing the data comprises generating key-value expressions such as described above for the various product options and associated filters. The serialized data may be stored in key-value store 106 and matched against incoming queries using the matching techniques described above.

In an embodiment, special-purpose data definitions for a key-value store 106 are provided and may be stored using a commercially available or open-source key-value store such as MemCache or other intermediate caches. In an embodiment, other infrastructure software elements make use of the special-purpose key-value store to use expressive relationships between products. Examples of other infrastructure elements include accessories, dependencies, defaults, and rendering.

In step 212, one or more attribute values are received that define a custom product. For example, if the user is customizing a Print, the user may specify the width and the height of the print. The attribute values selected or otherwise specified by the user may affect the availability and defaults of other attribute values for the custom product or accessory products. Furthermore, the attribute values selected by the user may affect what accessory products are recommended and how a representative image of the custom product is rendered.

In step 214, the received attribute values are used to search for matching option strings and filters. For example, the attributes and corresponding attribute value(s) may serialized into one or more key-value expressions, which may be used to query the product accessories framework. Matching operations such as described above may then be implemented to determine matching product options and filters. The matching product options and filters may then be used to provide a query result set.

In step 216, the results of the search are returned. The result set may identify or otherwise include, without limitation, constraints on the available attribute values and accessories that may be selected by the user, the default attribute values that should be displayed to a user, a set of compatible accessory products that should be recommended to the user, and a rendered image of the product.

3.3 Accessories Framework

In an embodiment, the product options framework comprises or can access an accessories framework comprising one or more computer programs, key-value store definitions, stored procedures, or other software elements that implement functions for determining whether one product can be an accessory to another product.

Further, the accessories framework is configured to determine product characteristics of multiple products and to enforce compatibilities. For example, in the context of framed products, a Frame could be defined having the following attributes: size=[w,h]; moldings; mount type; float widths[l, t, r, b]; mat1; mat2; mat widths[l, t, r, b]; glazing. The example attributes reflect the following logic. The size of a frame for a framed product may be compatible only with selected materials; frames may comprise molding types and legal frame opening sizes. The size of the customer requested frame may be incompatible with a particular molding type. Different mounting options may be provided such as float mounting that may be incompatible with particular print sizes or molding types or opening sizes. A float mounting may have specified widths of the float spacing for left, top, right and bottom parts of the product. There may be one or two mats having different types and different left, top, right and bottom widths. There may be plastic or glass glazing, or glazing may be absent.

Choices of different values for certain attributes may affect allowed values of other attributes and therefore the compatibility of the specified product with other products. For example, for a Print if Mat1 is present and has valid values, then the Float Widths are invalid or must be zero. If the Mount Type is Float then the Float Widths must have integer values and the Mat Widths values must be zero. If the Mount Type is Mat and the Mat Widths are 3", then the total product size becomes larger and the molding size may or may not be compatible with the resulting size and other values may become legal or illegal.

A Print may comprise size[w,h] and media. If the end user or customer is considering Print products, the computer system should obtain and display information about only other products (accessories) that are legal or allowed for manufacture with a particular Print. Therefore, there is a need to know whether a standard frame matches a selected print or whether a custom frame is possible. As an example, if the Size of the Print is [30,48] then a standard (fixed) size frame of [4,6] is not compatible and should be filtered out; however, a [32,48] frame will work and a frame of [30,46] might be compatible if cropping is used.

In an embodiment, the accessories framework comprises logic configured to implement a plurality of filters, comparison logic, and enforcement logic. In an embodiment, a first product is defined by an option string comprising key attributes and values in the form described for expressions [1] to [9] above as examples. The first product is also associated with a first filter definition, which may comprise a stored procedure in a SQL Server database or an equivalent procedure processing system. The comparison logic is configured to receive the first option string and apply the first filter definition to result in generating a result set of matching second products. For example, if the first option string specifies ProductType=Print, then the second products result set would exclude all products with a ProductType=Necktie.

The matching second products represent candidate accessories or compatible products subject to a second level of filtering. Each of the second products is defined by a different option string and has an associated second filter. The enforcement logic is also configured to apply each second filter to the first option string to determine whether the first product is compatible with that particular second product and to return a result of Valid or Invalid. If not, then that particular second product may be removed from the result set. For example, one of the second products may comprise a standard (fixed) size frame having a Size of [4,6] and its filter definition would exclude the first product if the Size of the Print is [30,48].

The enforcement logic then may generate or retrieve a further filter for enforcement purposes. Assume, for example, that the enforcement filter specifies only custom frame products having Size [32,48] with a Mount Type of Mat. The enforcement filter becomes bound to the first product and used in regulating the optional products that are displayed in a user interface to a user. Therefore, for example, as the user is browsing options for the particular print, the user will be able to select only frames that have a Size of [32,48] and can only select a Mount Type of Mat. Other attribute values may be enforced, such as to allow only non-glare glazing, etc.

In an embodiment, a Filter may be defined as a stored procedure in a database system. In an embodiment, a Filter comprises an association of a Filter Set ID; a Product ID; a Product Type; a Context; a Filter; a Filter Expression; and Filter Variables. The Filter Set ID is a unique value for identification purposes. The Product ID value is optional and may associate the filter with a particular product to indicate relevance to that product. The Product Type value is optional and may associate the filter with a particular product type to indicate relevance to that product type. The Context value is optional and may comprise a declarative string of the type described above with respect to context identification.

The Filter may comprise either a declarative string in the key-value formats described above, or one or more programmatic statements that implement filter logic in accordance with a programmatic evaluation language framework provided by the underlying database. For example, if an intentional or expressive definition of the filter cannot be known in advance then programmatic statements enable computing a declarative string for the filter on-the-fly. For example, size values can be computed and then captured in a declarative string that fully expresses the filter. A Filter Expression may comprise a static declarative string of the type described above or may be computed. The Filter Variables are optional and may identify computational values that are used with the programmatic statements.

Each filter also comprises or is related to a Mapping Table. The Mapping Table comprises a list of one or more options strings that identify products to recommend or output when the filter is matched. Thus, the output of a Filter may be a set of one or more recommended products that are compatible with or accessories for the first product that passes the filter. A Mapping Table may have any number of entries. The accessories framework is configured to obtain, when a first product passes a Filter, the contents of the Mapping Table for use in performing a second-level filtering of the first product against all second products that are identified in the Mapping Table. Each Mapping Table entry may identify required attributes for enforcement in the second level filtering step; thus, each Mapping Table has constraints that must be satisfied for the associated second product to be compatible with the first product.

A benefit of this approach is that developing complex or computed filters does not require changes in database schema but merely involves preparing a small snippet of program code that is placed in the filter declaration.

Figure 3:
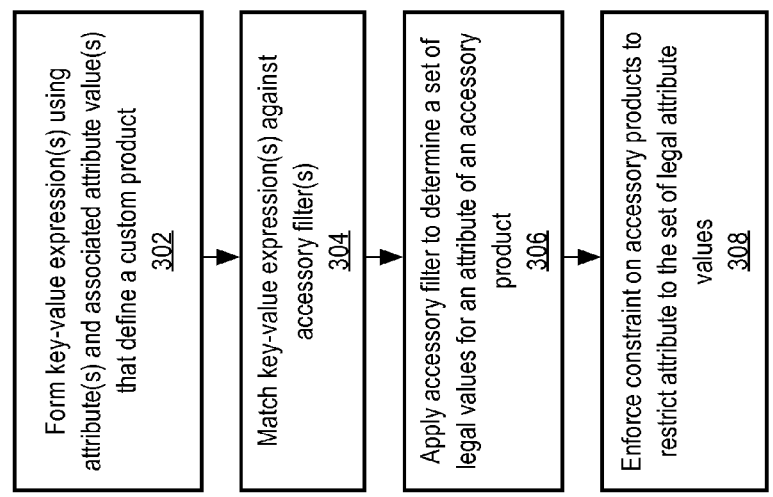
FIG. 3 is a flowchart illustrating an example process using an accessories framework, according to an embodiment.

FIG. 3 is a flowchart illustrating an example process for implementing and using accessories framework 112, according to an embodiment. In step 302, one or more key-value expressions such as those described for expressions [1] to [9] above are formed using attributes and attribute values that define a custom product. For example, the user may select or otherwise specify the dimensions of a particular custom print product. These dimensions may be serialized into an attribute string comprising one or more key-value pairs. The key-value pairs may include a first key-value pair comprising a width key and corresponding value identifying the width of the print and a second key-value pair comprising a height key and a corresponding value identifying the height of the print.

In step 304, the key-value expressions are matched against accessory filters associated with the custom product. For instance, width and height attribute key-value pairs may be matched with a filter that identifies compatible frame sizes for accessory frame products based on the associated width and height values. The filter may comprise one or more of Filter Set ID; a Product ID; a Product Type; a Context; a Filter; a Filter Expression; and Filter Variables as described above.

In step 306, the accessory filter is applied to determine a set of legal values for an attribute of an accessory product. For example, if the custom print has Size [32,48], then the enforcement logic may limit the size of accessory frames to [32, 48]. Alternatively, the enforcement logic may permit a range of sizes, such as [30-32, 46-48] to permit cropping or other customizations.

In step 308, a constraint is enforced on the accessory products to restrict the attribute to the set of legal attribute values. This step may comprise the enforcement logic limiting or otherwise preventing a user from selecting an illegal attribute value for the accessory product. The enforcement logic may also prevent accessory recommendations of accessories that have attribute values that are outside of the legal set of values. This step may also comprise performing secondary filtering as described above to determine the compatibility of the custom product as described by filters associated with the matched accessory products. Thus, even if the accessory products satisfy the first-level filtering, the enforcement logic may exclude the accessory product if the second-level filtering identifies that the custom product is incompatible.

3.4 Bundling Framework for Grouped Products

In an embodiment, the product options framework includes or can access a bundling framework providing logic to support processing attributes that are dependent on values of other attributes. The framework allows accounting for the fact that certain accessories may not fit a particular first product, and for determining compatibilities both in terms of product manufacturing and whether digital images of products are capable of visualizing or rendering in a display unit.

FIG. 6 illustrates an example of relationships between a product bundle, a filter set, and an accessory product. In an embodiment, a product bundle is defined as an association of two or more products that can be visualized together in a graphical user interface and are compatible or can be ordered together for use together or in a combined custom manufactured product. Logic implementing the bundle framework can resolve dependencies between products.

In an embodiment, a product bundle 602 comprises two or more products, for example, a Print 604 and a Frame 606. A bundle may reflect dependencies; for example, if Frame 606 is deleted from the bundle then the Print 604 may remain and could be visualized and ordered independently. Dependencies are not necessary and multiple products could be added to the bundle with no dependencies. In contrast, if the Print 604 is deleted then the Frame 606 also should be deleted because frames are not ordered separate from framed products.

Each product is associated with a particular filter 610A, 610B in a Filter Set 608. Each filter 610A, 610B matches a corresponding constituent product in the product bundle 602, and is associated with the product bundle via the Filter Set 608. The Filter Set 608 is valid only if each and every individual filter 601A, 610B matches the products in the product bundle 602. Thus, a Filter Set 608 can enforce joined constraints that apply to a product bundle as a whole. In an implementation, a Filter Set may be bound in its Mapping Table to one or more particular accessory products; the effect is to recommend the specified accessory products when all filters in the Filter Set are determined to match corresponding products of a Product Bundle.

An accessory product such as a hanger 612 for a framed print may be associated with one of the filters 610B as a dependent match on that filter. In an embodiment, a Filter Set 608 includes a declaration of a single dependency that references a particular dependent product or an options string that matches a plurality of dependent products. Consequently, if a particular dependent product such as hanger 612 is added to the product bundle 602, the dependency defined in the Filter Set 608 for that product bundle may be used to determine when to permit or remove the dependent product for purposes of offering, ordering for custom manufacture, or rendering in a user interface display. A dependent match reflects the concept that a particular accessory product may be appropriate to associate with a bundle only when both the constituent products of the bundle are in the bundle or only with a particular product in the bundle. For example, if the bundle 602 comprises both a Print 604 and Frame 606, then it is appropriate to offer the customer a hanger 612 for the combined framed product, and that hanger may be compatible only with the particular kind of Frame 606 and therefore the hanger is dependent on the Frame. However, if that Frame 606 is removed from the bundle, then the hanger 612 should not be offered.

In an embodiment, the bundling framework comprises logic to support accurate rendering of bundled products by determining which views of combined products are valid or should be shown in a graphical user interface or other display. In general, when products are added to a bundle, the bundling logic is configured to examine each product, filter each product based on filters as previously described, and select and order one or more allowed views based on matches of the filters. For example, when the Product Type is Shirt, then only views or rendering logic appropriate for Shirts should be used. When other Product Types are involved, then other views may provide a better rendering or showcasing of that particular product type.

The rendering logic is not required to enforce complete matching of products in a bundle to corresponding filters. FIG. 7 illustrates a product bundle having three constituent products associated with a filter set having two filters that define allowed rendering views for the products. It may be seen that only two of the products in the bundle have matching rendering filters. The absence of a match for the third product is acceptable and merely means that one product in the bundle is not rendered, which may be appropriate depending on the nature of the product. Instead, if the filters are a complete subset of the corresponding products, but not an exactly matching subset, rendering can proceed. The number of matching filters, however, indicates that views are increasingly relevant. Filters may express an order; for example it may be appropriate to first render an image of a print, then a mat, then a frame over the mat and print.

The rendering logic may be configured to accommodate product options and bundles. In an embodiment, the rendering logic supports defining rendering files and add elements to the rendering logic using declarative statements rather than pure programming. Attributes of views may be declared in rendering files that serve as configuration files to drive rendering processes. In an embodiment, the capabilities of the rendering logic are matched to bundles of products through other declaratory statements and the matching syntax that have been described above. In this arrangement, declarations in the rendering configuration files may be transformed into rendering parameters after parsing according to the matching syntax described above. For example, declarations that are consumable by the attributes engine may yield an output configuration file specifying allowed views of the corner of a framed print and rendering parameters for generating a correct visual rendering of the corners.

Declarations for particular products and the rendering logic may cooperate to produce compatible views for different products depending on whether a product has a matted or floated mount. Based on frame size, scaling may be applied to the rendered image. For example, if the print in a customer selection is relatively small, then scaling is applied to zoom in on the order of the print and preclude displaying areas outside the bounds of the print. Conversely, large prints should be given zoom-out scaling for correct rendering and instructions for scaling and other effects may be declared as part of rendering filters. Filter declarations for rendering also may contain references to textures for use in rendering operations for frame elements, mats, and other product features.

3.5 Defaulting Framework

In an embodiment, it may be useful to offer end user consumers a set of default attributes for each particular Product Type. Because the present approaches may be used to offer a large number of product types each having many attributes with a large number of resulting permutations, the sheer number of available choices could potentially overwhelm a user. Therefore, in an embodiment, a defaulting framework comprises logic for declaring and enforcing various default attribute values to assist users in making product selections. The defaulting framework also provides flexible and declarative mechanisms for introducing new products into the system with specification of appropriate default values.

A defaulting framework is also beneficial in assigning an appropriate default value to various product attributes. For example, when Product Type is T-shirt, an appropriate default value for a Size attribute may be Large; when the Product Type is Infant Creeper, the appropriate default value for Size may be "6 Months". Thus, it will be clear that not all values for Size are relevant to all product types. Accordingly, an analyst or other product manager can declare a default value for each attribute value to enable the system to rapidly display example value options to the end user consumer. For example, the user may have selected Shirts, but may not have selected a Color value; the defaulting engine can review declarations to identify the one that is most relevant to the current set of end user selections and apply that default value to the rendering display and to other frameworks and filters.

In an embodiment, as a user selects or changes a particular attribute value, the default values for other attributes of the same product may also change. For example, one declaration might provide that if the Product is a giclee print and the Mount Type is Float, then a related default is: {Molding !=Metal} (is not metal). Alternatively, if the Product is a Print, the Print Size is [20,16] and the Mount Type is Mat, then the Mat Size values might default to 3" in order to present a good default appearance. For a small print, the default mat size might be much smaller.

An example defaulting declaration is: Size.Default=Large. Alternatively, a defaulting declaration is: When Style=InfantTShirt then Size.Default=6 Months. Successive levels of defaults may be provided; for example, an alternative declaration may state: If Style=InfantTShirt & Color=Lime:: Size.Default=12 Months. Thus, successive default declarations may establish, with progressively greater granularity, narrower sets of rules for defaulting that override prior broader rules.

In an embodiment, each defaulting declaration is expressed in the same form described above for a Filter. Filter Expression variables are evaluated based on Filter Variable declarations and the current Context to yield a Filter; the resulting Filter matches on certain products and maps to the default attribute values, which may be declared in the Map Table of the Filter.

Figure 4:
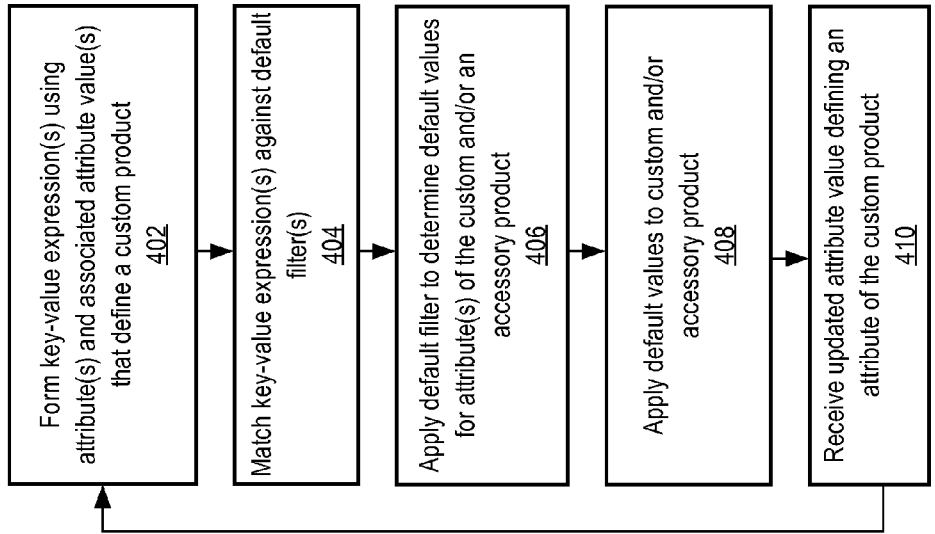
FIG. 4 is a flowchart illustrating an example process for using a defaulting framework, according to an embodiment.

FIG. 4 is a flowchart illustrating an example process for implementing and using defaulting framework 116, according to an embodiment. In step 402, one or more key-value expressions such as those described for expressions [1] to [9] above are formed using attributes and attribute values that define or are otherwise associated with a custom product. These may be the same attributes and values of the custom product used at step 302 for the accessory filtering or different attribute and values, depending on the implementation.

In step 404, the key-value expressions are matched against default filters. For instance, if the user is designing a T-shirt and has selected a black color, then the attribute "Color" and associated value "Black" may be matched with one or more relevant default filters. Relevant default filters in this context may be any filter where the Color attribute is used in determining and selecting default values In step 406, the default filter is applied to determine default values for attributes of the custom product and/or accessory products. For example, if the user has selected a color of black, then a default filter may determine that a large should be the default size of the T-shirt. If baseball caps are recommended, then the default Color recommended may be Green.

In step 408, the default value is applied to the custom and/or accessory product. This step may comprise selecting the default value and causing the selected value to be displayed to the end user. For example, if the user is designing a custom T-shirt and selects a Color of Black, then the system may automatically select Large as the default Size. These attribute values may be used to render a representative image of a large, black T-shirt.

While designing the custom product, the user may update one or more attribute values that affect the default values of other attributes. Accordingly, if an updated attribute value is received at step 410, then the process may return to step 402 to update the default values. For example, if the user changes the Color attribute from Black to Purple, then the default Size attribute may be changed from Large to Medium.

3.6 Rendering Framework

Rendering framework 730 may comprise one or more computer programs, other software elements such as stored procedures, or other computer logic configured to perform the following functions. Further, the rendering framework 730 may be coupled to logic that is specially configured to perform rendering 3D models into 2D graphical images that can be delivered to a user station such as a browser. In an embodiment, the rendering logic is termed a realview rendering engine.

In an embodiment, the user is shown a synthetically constructed image of the product that the user is configuring for manufacturing. In creating this rendering, not all product options are enumerated as prebuilt images. Some options, such as final product size may not affect the image generation. Other options, such as frame color or printing surface may be synthetically applied to the image. Choosing appropriate key-value subsets and mapping those to the realview rendering engine is another extension of the options framework.

In an embodiment, the user is shown an array of images to suggest alternative products, accessories and bundles that may be manufactured. Choosing a small set of possible products from all available configurations that satisfy the multiple constraints of being able to manufacture the product, being able to synthetically preview the product and any additional contextual constraints imposed by the user or seller is handled by the options framework. The ability to not only constrain the solution set but to mark constrained solution as being more or less relevant is key to providing a successful user experience.

In an embodiment, the option framework is used to map select product attributes to render engine instructions. The mapping may implement the matching logic described above. For example, the key-value pairs for the select product attributes may map to specific render files. The realview rendering engine may access these render files to generate an image.

In an embodiment, the option framework is used to normalize and minimize the query strings associated with a generated realview image to maximize the effective use and performance of external image caches.

Figure 5:
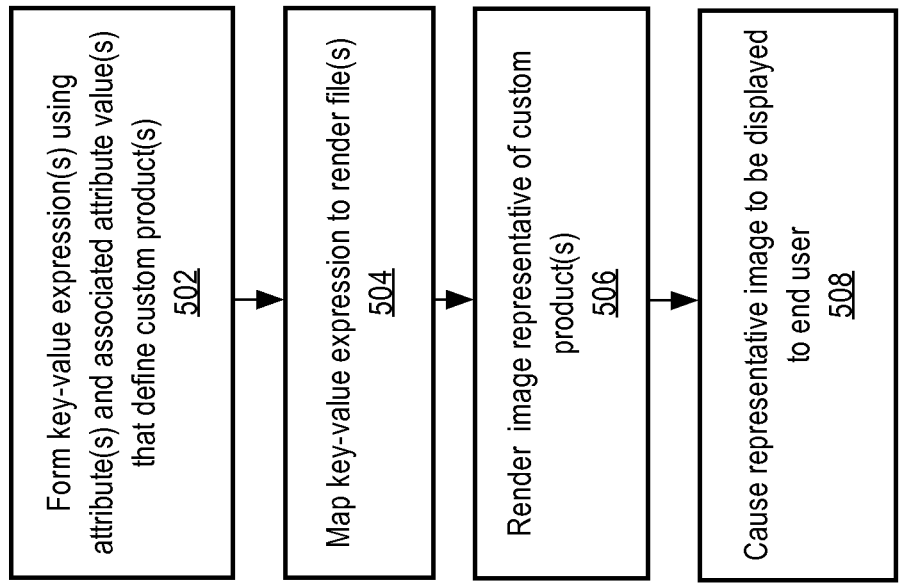
FIG. 5 is a flowchart illustrating an example process for using a rendering framework, according to an embodiment.

FIG. 5 is a flowchart illustrating an example process for implementing and using rendering framework 130, according to an embodiment. In step 502, one or more key-value expressions such as those described for expressions [1] to [9] above are formed using attributes and attribute values that define one or more custom product(s). In an embodiment, this step may include forming key-value expressions for each product in a product bundle.

In step 504, the key-value expressions are mapped to render files. For instance, if the user has designed a custom Print with dimensions of 32×48 inches and bundled the Print with a black wood frame, then the following key-value expression may be formed: Size=[32×48] & Molding=Wood & Color=Black. This expression may map to one or more render files which may be processed by the rendering engine to render an image reflecting the print in the custom frame.

In step 506, the rendering engine renders an image representative of the custom product. Any suitable rendering process may be implemented at this steps that uses the render files identified at step 504 to generate an appropriate image representation of a custom product or product bundle. For example, this step may include rendering 3D models into 2D graphical images that can be delivered to a user station such as a browser.

In step 508, the representative image is displayed to the end user that is designing the product. This step may comprise, for example, causing the representative image to be displayed through a web browser or other application program that the user is using to design the custom product.

3.7 Additional Frameworks

In addition to the frameworks described above, attributes engine 108 allows facilitates the addition and implementation of other frameworks without requiring complex database schemas or complex programming. In one embodiment, a pricing framework may be provided. The pricing framework may map key-value expressions to corresponding price values. For example, if a new product includes a new attribute value for a particular attribute that is relevant in calculating the price, then a new key name may be generated and written into the pricing tables. The key-value matching may then apply a pricing filter such that when the particular attribute has the new attribute value, the price is changed to the identified price.

In another embodiment, a description framework may be provided to enable other elements of the system to retrieve or obtain product descriptions.

4.0 Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. The input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, by a server computer from a user that is customizing a custom product, a first attribute value that defines an attribute of the custom product;
   in response to receiving the first attribute value, generating, by the server computer based at least in part on the first attribute value and one or more other attributes of the custom product, a particular key-value expression that includes a plurality of key attributes and values;
   matching, by the server computer, the particular key-value expression to a set of one or more render files stored in volatile or non-volatile storage;
   based on the set of one or more render files, rendering an image of the custom product.

2. The method of claim 1, wherein the first attribute value is an arbitrary attribute value selected by the user that is customizing the custom product.

3. The method of claim 1, further comprising matching the particular key-value expression to a set of default attribute values for the custom product; and causing display of the set of default attribute values for the custom product.

4. The method of claim 1, wherein the custom product is part of a product bundle that associates the custom product with a second product; the method further comprising rendering a particular view of the product bundle using the set of one or more render files.

5. The method of claim 1, further comprising matching the particular key-value expression to at least one filter that defines allowed rendering views for a product bundle that includes the custom product; and determining the allowed rendering views for the product bundle that includes the custom product based on the at least one filter.

6. The method of claim 1, further comprising causing display of a plurality of images based on the set of one or more render files; wherein the plurality of images include an image for at least one of an alternative product, an accessory that is compatible with the custom product, or a bundle that includes the custom product.

7. The method of claim 1, wherein rendering the image of the custom product comprises rendering a three dimensional model into a two dimensional graphical image for display by a browser interface.

8. The method of claim 1, further comprising determining a view for displaying the custom product based on the particular key-value expression.

9. The method of claim 1, wherein the set of one or more render files include declaratory statements for matching to key-value expressions based on set operations.

10. The method of claim 1, further comprising receiving, from the user that is customizing the custom product, a second attribute value that defines a second attribute of the custom product; in response to receiving the second attribute value, generating, based at least in part on the second attribute value and one or more other attributes of the custom product, an updated key-value expression for the custom product; matching the updated key-value expression for the custom product to an updated set of render files; and rendering an updated image for the custom product based on the updated set of render files.

11. One or more non-transitory computer-readable media storing one or more sequences of instructions which, when executed, cause performance of:
   receiving, from a user that is customizing a custom product, a first attribute value that defines an attribute of the custom product;
   in response to receiving the first attribute value, generating, based at least in part on the first attribute value and one or more other attributes of the custom product, a particular key-value expression that includes a plurality of key attributes and values;
   matching the particular key-value expression to a set of one or more render files;
   based on the set of one or more render files, rendering an image of the custom product.

12. The one or more non-transitory computer-readable media of claim 11, wherein the first attribute value is an arbitrary attribute value selected by the user that is customizing the custom product.

13. The one or more non-transitory computer-readable media of claim 11, further storing instructions causing performance of: matching the particular key-value expression to a set of default attribute values for the custom product; and causing display of the set of default attribute values for the custom product.

14. The one or more non-transitory computer-readable media of claim 11, wherein the custom product is part of a product bundle that associates the custom product with a second product; the one or more non-transitory computer-readable media further storing instructions causing performance of rendering a particular view of the product bundle using the set of one or more render files.

15. The one or more non-transitory computer-readable media of claim 11, further storing instructions causing performance of matching the particular key-value expression to at least one filter that defines allowed rendering views for a product bundle that includes the custom product; and determining the allowed rendering views for the product bundle that includes the custom product based on the at least one filter.

16. The one or more non-transitory computer-readable media of claim 11, further storing instructions causing performance of displaying a plurality of images based on the set of one or more render files; wherein the plurality of images include an image for at least one of an alternative product, an accessory that is compatible with the custom product, or a bundle that includes the custom product.

17. The one or more non-transitory computer-readable media of claim 11, wherein instructions for rendering the image of the custom product comprise instructions for rendering a three dimensional model into a two dimensional graphical image for display by a browser interface.

18. The one or more non-transitory computer-readable media of claim 17, further storing instructions causing performance of determining a view for displaying the custom product based on the particular key-value expression.

19. The one or more non-transitory computer-readable media of claim 17, wherein the set of one or more render files include declaratory statements for matching to key-value expressions based on set operations.

20. The one or more non-transitory computer-readable media of claim 11, further storing instructions causing performance of receiving, from the user that is customizing the custom product, a second attribute value that defines a second attribute of the custom product; in response to receiving the second attribute value, generating, based at least in part on the second attribute value and one or more other attributes of the custom product, an updated key-value expression for the custom product; matching the updated key-value expression for the custom product to an updated set of render files; and rendering an updated image for the custom product based on the updated set of render files.

* * * * *